United States Patent [19]
Nanno

[11] Patent Number: 6,082,717
[45] Date of Patent: Jul. 4, 2000

[54] VIBRATION DAMPING DEVICE INCLUDING PNEUMATICALLY OSCILLATED MEMBER PARTIALLY DEFINING FLUID-FILLED PRESSURE-RECEIVING CHAMBER

[75] Inventor: Takanobu Nanno, Kasugai, Japan

[73] Assignee: Tokai Rubber Industries, Ltd., Japan

[21] Appl. No.: 08/988,609

[22] Filed: Dec. 11, 1997

[30] Foreign Application Priority Data

Dec. 24, 1996 [JP] Japan .................................. 8-343686

[51] Int. Cl.⁷ ......................................................... F16F 5/00
[52] U.S. Cl. .................. 267/140.14; 267/140.15
[58] Field of Search .................. 267/140.11, 140.13, 267/140.14, 140.15, 219; 180/312; 248/562, 636

[56] References Cited

U.S. PATENT DOCUMENTS

| | | | |
|---|---|---|---|
| 4,650,169 | 3/1987 | Eberhard et al. ..................... | 267/140.1 |
| 4,828,234 | 5/1989 | Hoying et al. . | |
| 4,840,358 | 6/1989 | Hoying et al. ........................ | 267/140.1 |
| 5,098,072 | 3/1992 | Muramatsu et al. . | |
| 5,114,124 | 5/1992 | Muramatsu ........................ | 267/140.1 A |
| 5,145,156 | 9/1992 | Muramatsu et al. ............... | 267/140.14 |
| 5,167,403 | 12/1992 | Muramatsu et al. ............... | 267/140.13 |
| 5,170,998 | 12/1992 | Muramatsu ........................ | 267/140.13 |
| 5,180,148 | 1/1993 | Muramatsu ........................ | 267/140.14 |
| 5,215,294 | 6/1993 | Muramatsu et al. ............... | 267/140.13 |
| 5,217,211 | 6/1993 | Ide et al. ............................. | 267/140.13 |
| 5,246,212 | 9/1993 | Funahashi et al. ................. | 267/140.13 |
| 5,267,726 | 12/1993 | Takeo et al. ........................ | 267/140.14 |
| 5,386,977 | 2/1995 | Quast ................................. | 267/140.13 |
| 5,437,437 | 8/1995 | Takano et al. ...................... | 267/140.14 |
| 5,437,438 | 8/1995 | Takano et al. ...................... | 267/140.14 |
| 5,462,262 | 10/1995 | Gennesseaux ..................... | 267/140.13 |

FOREIGN PATENT DOCUMENTS

| | | |
|---|---|---|
| 0115417 | 8/1984 | European Pat. Off. . |
| 0164081 | 12/1985 | European Pat. Off. . |
| 0440260 | 8/1991 | European Pat. Off. . |
| 0690244 | 1/1996 | European Pat. Off. . |
| 2663706 | 12/1991 | France .............................. 267/140.13 |
| 3447746 | 7/1986 | Germany . |
| 3638944 | 6/1987 | Germany . |
| 60-8540 | 1/1985 | Japan . |
| 61-2939 | 1/1985 | Japan . |

OTHER PUBLICATIONS

Patent Abstracts of Japan, vol. 016, No. 191 (M–1245), May 8, 1992 —JP 04 025635.
Patent Abstracts of Japan, vol. 011, No. 140 (M–586), May 8, 1987 —JP 61 278639.
Patent Abstracts of Japan, vol. 017, No. 572 (M–1497), Oct. 18, 1993 —JP 05 164183.
Kim et al., "Engine Vibration Control Using Passive, Active, and Adaptive Hydraulic Mount Systems." SAE Technical Series, 1993, pp. 1–9.

*Primary Examiner*—Robert J. Oberleitner
*Assistant Examiner*—Jeffrey Woller
*Attorney, Agent, or Firm*—Parkhurst & Wendel, L.L.P.

[57] ABSTRACT

Fluid-filled vibration damping device wherein two mutually spaced-apart mounting members are connected by an elastic body, which cooperates with a movable member to at least partially defines a fluid-filled pressure-receiving chamber, and the movable member partially defines a working air chamber on its side remote from the pressure-receiving chamber and is oscillated by a periodic change of an air pressure applied to the working air chamber through a pressure inlet, so as to cause a periodic change of the pressure of the fluid in the corresponding pressure-receiving chamber, for thereby controlling a damping characteristic of the damping device.

11 Claims, 4 Drawing Sheets

VIBRATION DAMPING DEVICE INCLUDING PNEUMATICALLY OSCILLATED MEMBER PARTIALLY DEFINING FLUID-FILLED PRESSURE-RECEIVING CHAMBER

This application is based on Japanese Patent Application No. 8-343686 filed Dec. 24, 1996, the content of which is incorporated hereinto by reference.

BACKGROUND OF THE INVENTION

1. Field of the Invention

The present invention relates to a fluid-filled vibration damping device which has a pressure-receiving chamber filled with a non-compressible fluid whose pressure changes upon application of a vibrational load thereto, and whose vibration damping characteristic can be suitably adjusted by controlling the pressure of the fluid within the pressure-receiving chamber.

2. Discussion of the Related Art

As one kind of a vibration damper interposed between two members of a vibration system so as to connect these two members in a vibration damping manner or mount one of these members on the other member in a vibration damping manner, there is known a fluid-filled vibration damping device having an elastic body which elastically connects a first and a second mounting member that are disposed in mutually spaced-apart relationship with each other. The elastic body partially define a pressure-receiving chamber filled with a non-compressible fluid the pressure of which changes upon application of a vibrational load between the first and second mounting members. JP-A-60-8540 and JP-A-61-2939 show examples of such a fluid-filled vibration damping device, wherein the pressure-receiving chamber is partially defined by a movable member which is movable or displaceable relative to the first and second mounting members. The vibration damping characteristic of this type of vibration damping device can be adjusted as desired by oscillating the movable member at a frequency corresponding to the frequency of the vibrations to be damped, so as to control the fluid pressure within the pressure-receiving chamber. Thus, the fluid-filled vibration damping device of the type described above exhibits a controlled vibration damping characteristic suitable for effectively damping the input vibrational load.

The known fluid-filled vibration damping device described above must have electromagnetic drive means for oscillating the movable member, as described in the above-identified publications. The electromagnetic drive means includes a relatively large number of comparatively expensive components such as a permanent magnet and a coil. Accordingly, the damping device is difficult to manufacture at a low cost, and inevitably has relatively large size and weight.

For assuring a sufficient degree of stability of the electromagnetic force generated by the electromagnetic drive means, the permanent magnet, coil and other components must be built in the damping device with high positional and dimensional accuracy, requiring a highly sophisticated technique for the manufacture of the damping device, thereby reducing the efficiency of large-scale production.

The known fluid-filled vibration damping device suffers from other drawbacks such as a temperature rise due to heat generated by energization of the coil, and a relatively large amount of electric power consumption, where the fluid pressure in the pressure-receiving chamber is kept controlled for a long time or controlled with a considerably large force of oscillation of the movable member.

SUMMARY OF THE INVENTION

It is therefore an object of this invention to provide a relatively small-sized, light-weight fluid-filled vibration damping device which is simple in construction with a relatively small number of components, and which incorporates a mechanism suitable for oscillating a movable member so as to effectively control the fluid pressure within the pressure-receiving chamber.

It is an optional object of this invention to provide a fluid-filled vibration damping device capable of adjusting its vibration damping characteristic with improved stability, without the conventionally encountered drawbacks such as heat generation and high requirement for electric power consumption by the oscillating mechanism, even where the fluid pressure in the pressure-receiving chamber is continuously controlled for a long time.

According to the present invention, there is provided a fluid-filled vibration damping device comprising: (a) a first and a second mounting member which are spaced apart from each other; (b) an elastic body elastically connecting the first and second mounting members and partially defining at least one pressure-receiving chamber each of which is filled with a non-compressible fluid, the elastic body being elastically deformed so as to cause a change in a pressure of the fluid in the each pressure-receiving chamber, upon application of a vibrational load between the first and second mounting members; (c) a movable member partially defining each of at least one of the above-indicated at least one pressure-receiving chamber and movable relative to the first and second mounting members, the movable member partially defining a working air chamber on one of opposite sides thereof which is remote from the corresponding pressure-receiving chamber, the movable member being oscillated by a periodic change of an air pressure in the working air chamber, so as to cause a periodic change of the pressure of the fluid in the corresponding pressure-receiving chamber; and (d) means for defining a pressure inlet through which the air pressure is applied to the working air chamber.

In the fluid-filled vibration damping device constructed according to the present invention as described above, the movable member is oscillated by a periodic change of the air pressure in the working air chamber, whereby the pressure of the fluid in the pressure-receiving chamber is periodically changed. In other words, the periodic change of the air pressure in the working air chamber is transferred to the pressure-receiving chamber through the oscillation of the movable member, so that the fluid pressure in the pressure-receiving chamber can be controlled by controlling the air pressure in the working air chamber.

The present fluid-filled vibration damping device does not incorporate or require any actuator such as electromagnetic drive device for oscillating the movable member, but is capable of controlling the fluid pressure within the pressure-receiving chamber. Accordingly, the present damping device is simple and compact in construction with a reduced number of components and a reduced weight, and is therefore comparatively easy and economical to manufacture.

Further, the present fluid-filled vibration damping device permits the fluid pressure within the pressure-receiving chamber to be suitably changed by utilizing an external air pressure source. The use of the air pressure from the pressure source permits a continuous operation of the damping device so as to exhibit a desired vibration damping effect with high stability, without the conventionally experienced drawbacks such as a temperature rise of the device due to heat generated by the electromagnetic drive means and a relatively large amount of consumption of electric power. Where the present damping device is used for a motor vehicle having an internal combustion engine, the reduced pressure for the damping device is readily available from the engine, and a vacuum pressure source exclusively used for the damping device is not necessary.

According to one preferred form of this invention, the movable member includes a rubber plate having an elasticity by which the movable member is restored its original shape or position. In this case, the air pressure change in the working air chamber can be effectively transmitted to the pressure-receiving chamber through the elastic deformation or displacement of the elastic rubber plate. The use of the elastic rubber plate for the movable member is effective to improve the response of the fluid pressure in the pressure-receiving chamber and the response of the damping device. In addition, the movable member can be restored by its own elasticity to its original position with high stability, facilitating the control of the fluid pressure in the pressure-receiving chamber. For instance, the rubber plate is held in its original position and shape while the working air chamber is exposed to the atmospheric pressure, and is moved to another position upon exposure to a reduced pressure. In this case, the movable member can be suitably returned to its original position by its elasticity when the pressure in the working air chamber is changed from the reduced pressure to the atmospheric pressure.

The rubber plate may be provided with a relatively rigid member fixed thereto for restricting or controlling the amount and direction of deformation or displacement of the rubber plate.

According to another preferred form of this invention, the fluid-filled vibration damping device further comprises biasing means for biasing the movable member in a predetermined direction, for instance, toward the pressure-receiving chamber or the working air chamber. The movable member may be oscillated by alternate application of: reduced and atmospheric pressures; positive and atmospheric pressures; two different levels of reduced pressure; or two different levels of positive pressure. In either of these cases, the biasing means may be provided to bias the movable member in a selected direction, so that the movable member which has been displaced from a first position to a second position in the direction opposite to that selected direction by application of a selected air pressure is returned to the first position with the aid of the biasing force of the biasing means. Thus, the biasing means assures stable oscillation of the movable member, and accurate and stable control of the fluid pressure in the pressure-receiving chamber.

Where the movable member includes a rubber plate whose elasticity permits the movable member to be restored to its original position, the biasing means reduces the fatigue of the rubber plate, permitting the rubber plate to maintain its original characteristic of displacement for a long time, so that the desired characteristic of control of the fluid pressure in the pressure-receiving chamber can be maintained for a long time.

According to a further preferred form of this invention, the movable member and the working air chamber are provided at each of a plurality of positions of the corresponding pressure-receiving chamber, such that the movable members at the plurality of positions partially define the corresponding pressure-receiving chamber and such that the working air chambers at the plurality of positions are formed independently of each other.

In the fluid-filled vibration damping device according to the above preferred form of the invention, the volume of each of the working air chambers can be made relatively small, thereby improving the response of the fluid pressure control in the pressure-receiving chamber to the air pressure control in the working air chambers, while assuring the required amount of change of the fluid pressure in the pressure-receiving chamber. In addition, the use of the two or more sets of movable members and working air chambers makes it possible to increase the freedom of control of the fluid pressure in the pressure-receiving chamber in different patterns depending upon different oscillation phases of the respective movable members.

According to a yet further preferred form of this invention, the fluid-filled vibration damping device further comprises: (e) at least one flexible diaphragm each of which partially defines an equilibrium chamber filled with the non-compressible fluid, such that the each flexible diaphragm permits a change in a volume of the equilibrium chamber; and (f) means for defining an orifice for fluid communication between the corresponding pressure-receiving chamber and the equilibrium chamber.

In the above preferred form of the invention, the damping device exhibits an enhanced vibration damping characteristic based on the resonance of the fluid flowing through the orifice. In this case, the movable member may be oscillated to control the fluid pressure in the pressure-receiving chamber, for the purpose of increasing the amount of flows of the fluid through the orifice, for thereby increasing the vibration damping effect based on the flows of the fluid through the orifice. The two or more flexible diaphragms may be provided to provide respective two or more equilibrium chambers which communicate with the pressure-receiving chamber through the respective orifices.

According to a still further preferred form of this invention, the first mounting member consists of an inner sleeve, while the second mounting member consists of an outer sleeve disposed radially outwardly of the inner sleeve, the elastic body being interposed between the inner and outer sleeves and having a pocket which is open in an outer circumferential surface thereof and closed by the outer sleeve so as to form the corresponding pressure-receiving chamber, the movable member being disposed within the pocket and cooperating with the outer sleeve to define the working air chamber.

The vibration damping device according to the above preferred form of the invention, which may be referred to as a cylindrical damper, can be suitably used as an engine mount, a differential mount or a suspension bushing, for front-engine front-drive motor vehicles, for example.

According to one advantageous arrangement of the above preferred form of the present invention using the inner and outer sleeves, the fluid-filled vibration damping device further comprises: (e) a flexible diaphragm which is disposed between the inner and outer sleeves at a position spaced from the corresponding pressure-receiving chamber in a circumferential direction of the inner and and sleeves, the flexible diaphragm partially defining an equilibrium chamber filled with the non-compressible fluid, such that the flexible diaphragm permits a change in a volume of the equilibrium chamber; and (f) an orifice member disposed in fluid-tight contact with an inner circumferential surface of the outer sleeve so as to extend along an opening of the pocket in the circumferential direction, the orifice member and the outer sleeve defining an orifice for fluid communication between the corresponding pressure-receiving chamber and the equilibrium chamber. In this case, the orifice member has a through-hole, and the movable member includes a rubber plate which is bonded to the orifice member and which closes the through-hole. The rubber plate cooperates with the orifice member and the outer sleeve to define the working air chamber, the outer sleeve having the pressure inlet.

In the fluid-filled vibration damping device of the cylindrical damper type constructed as described above, the orifice can be advantageously provided for fluid communication between the pressure-receiving and equilibrium chambers, for enabling the damping device to exhibit an enhanced vibration damping effect based on the resonance of the fluid flowing through the orifice. In this respect, the movable member may be oscillated to control the fluid pressure in the pressure-receiving chamber, for the purpose of increasing the amount of flows of the fluid through the orifice, for thereby increasing the vibration damping effect based on the flows of the fluid through the orifice.

According to still another preferred form of the present invention, the fluid-filled vibration damping device further comprises a pressure control device connected to the working air chamber through the pressure inlet, for changing the air pressure in the working air chamber in synchronization with a frequency of the vibrational load to be damped by the damping device.

In the fluid-filled vibration damping device according to the above preferred form of the invention, the fluid pressure in the pressure-receiving chamber is controlled depending upon the frequency of the vibrational load applied to the damping device, so as to effectively damp the input vibration. To change the air pressure in the working air chamber in synchronization with the frequency of the input vibration, the pressure control device may preferably include an air pressure source such as a vacuum pressure source, and a switch valve for selectively applying a reduced (negative) or positive pressure from the air pressure source and an atmospheric pressure to the working air chamber through the pressure inlet. For facilitating the control of the switch valve at a relatively high frequency, the switch valve is desirably a solenoid-operated switch valve, which may be controlled in a known adaptive control fashion or according to a stored data map, on the basis of an output signal of a vibration sensor such as an acceleration sensor.

The present fluid-filled vibration damping device may have a plurality of pressure-receiving chambers each of which is partially defined by the movable member which partially defines the working air chamber.

BRIEF DESCRIPTION OF THE DRAWINGS

The above and optional objects, features, advantages and technical and industrial significance of the present invention will be better understood by reading the following detailed description of presently preferred embodiments or modes of the invention, when taken in connection with the accompanying drawings, in which.

DETAILED DESCRIPTION OF THE PREFERRED EMBODIMENTS

Figure 1:
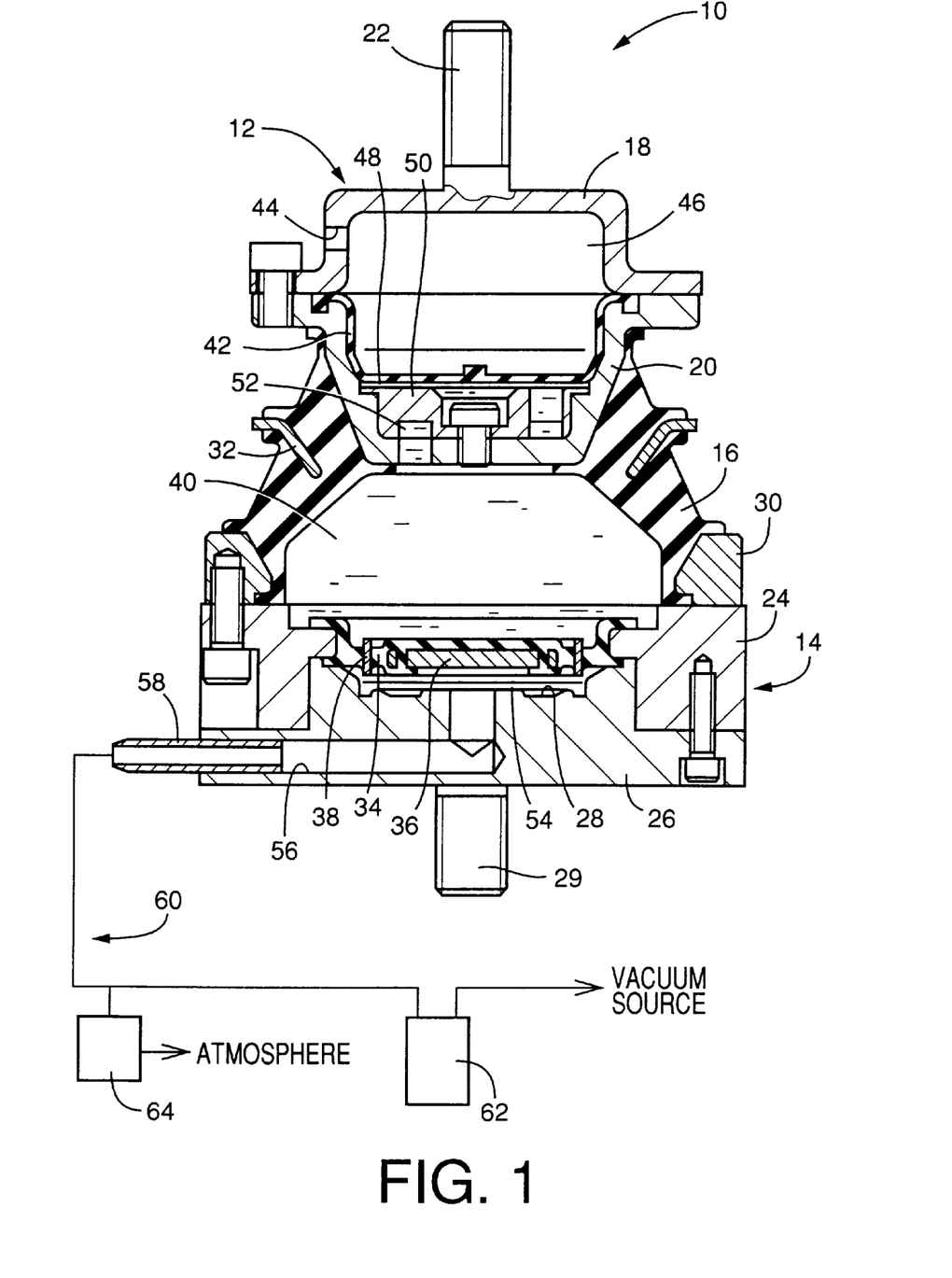
FIG. 1 is an elevational view in axial cross section of a fluid-filled vibration damping device in the form of an engine mount constructed according to one embodiment of this invention.

Referring first to FIG. 1, an engine mount 10 for a motor vehicle is shown as one embodiment of the fluid-filled vibration damping device of the present invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material, and are attached to one and other of the power unit and the body of the motor vehicle, so that the power unit which includes an engine is mounted on the vehicle body in a vibration damping fashion. With this engine mount 10 installed on the vehicle as described above, the elastic body 16 is held elastically compressed with the weight of the power unit acting on the engine mount 10. The engine mount 10 is installed so as to damp input vibrations which are applied in the direction in which the two mounting members 12, 14 are opposed to each other, namely, in the vertical direction as seen in FIG. 1 and in a direction almost parallel to the vertical direction.

The first mounting member 12 includes an upper metal member 18 and a lower metal member 20, which are both cup-shaped members each having an outward flange at its opening. The upper and lower metal members 18, 20 are superposed on each other at their outward flanges in the axial or vertical direction and are bolted together at the flanges, so as to constitute a hollow structure. The upper metal member 18 has a mounting screw 22 secured to its bottom wall so as to extend in the upward direction. The engine mount 10 is fixed with the mounting screw 22 to one of the power unit and body of the vehicle.

The second mounting member 14 includes an annular support member 24 and a circular disc-shaped bottom member 26, which are both made of metallic materials. These support and bottom members 24, 26 are superposed on each other in the axial or vertical direction and bolted together, so as to constitute a generally disc-like structure having a relatively large thickness or axial dimension. This generally disc-like structure has a recess 28 formed in a central area of its upper surface, such that the recess 28 is open upwards. The bottom member 26 has a mounting screw 29 secured to its bottom wall so as to extend in the downward direction, so that the engine mount 10 is fixed with the mounting screw 29 to the other of the vehicle power unit and body.

The second mounting member 14 is disposed below the first mounting member 12 such that the second mounting member 14 is opposed to and spaced apart from the first mounting member 12 in the axial direction, with a predetermined axial or vertical spacing distance. The elastic body 16 is interposed between the two mounting members 12, 14 for elastic connection therebetween.

The elastic body 16 has a hollow frusto-conical shape having a relatively large wall thickness. The lower part 20 of the first mounting member 12 and a connecting ring 30 are bonded to the small-diameter and large-diameter open ends of the elastic body 16, respectively, in the process of vulcanization of a rubber material to form the elastic body 16. The connecting ring 30 is superposed on the upper surface of the annular support member 24 of the second mounting member 14, and bolted to the annular support member 24, whereby the elastic body 16 is secured at its large-diameter end to the second mounting member 14. The elastic body 16 has a restricting ring 32 almost entirely embedded in an axially intermediate portion thereof. This restricting ring 32 is provided to prevent buckling of the elastic body 16, thereby stabilizing the elastic deformation of the elastic body 16.

In the recess 28 formed in the second mounting member 14, there is disposed a rubber plate 34 having a suitable thickness. The rubber plate 34 is bonded at its outer periphery to the inner circumferential surface of the annular support member 24 in the process of vulcanization of a rubber material to form the rubber plate 34, so that the bottom member 26 and the rubber plate 34 cooperate to define a fluid-tight space. To a central portion of the inner surface of the rubber plate 34, there is bonded a circular metal plate 36. A a metal ring 38 is disposed radially outwardly of the metal plate 36 with a suitable radial spacing therebetween, and is bonded to the rubber plate 34. The metal plate 36 and the metal ring 38 provide the rubber plate 34 with a desired spring characteristic, and prevent irregular deformation of the rubber plate 34. The rubber plate 34, metal plate 36 and metal ring 38 cooperate to constitute a movable member.

The lower part 20 of the first mounting member 12 the elastic body 16, the annular support member 24 of the second mounting member 14 and the rubber plate 34 cooperate to define a pressure-receiving chamber 40 between the first and second mounting members 12, 14. The pressure-receiving chamber 40 is filled with a suitable non-compressible fluid such as water, alkylene glycol, polyalkylene glycol or silicone oil. Upon application of a vibrational load between the first and second mounting members 12, 14 in the vertical direction, the elastic body 16 is elastically deformed in the opposite axial directions, whereby the pressure of the fluid in the chamber 40 is periodically changed.

Within the hollow structure of the first mounting member 12, there is disposed a flexible diaphragm 42 whose peripheral portion is sandwiched or gripped by and between the upper and lower parts 18, 20. The flexible diaphragm 42 divides the space of the hollow structure into two fluid-tight sections, which are partially defined by the upper and lower parts 18, 20. Namely, the upper part 18 and the flexible diaphragm 42 cooperate to define an air chamber 46 communicating with the external space through a vent 44 formed through the upper part 18. On the other hand, the lower part 20 and the flexible diaphragm 42 cooperate to define an equilibrium chamber 48 filled with the same non-compressible fluid as that in the pressure-receiving chamber 40. The air chamber 46 permits deformation or displacement of the flexible diaphragm 42, which in turn permits a change in the volume of the equilibrium chamber 48.

A circular disc-shaped orifice member 50 is disposed within the equilibrium chamber 48 and is bolted to the bottom wall of the lower part 20 of the first mounting member 12, which bottom wall partially defines the equilibrium chamber 48 and the pressure-receiving chamber 40 on its opposite sides. The orifice member 50 has a circumferential groove formed in its lower surface contacting the bottom wall of the lower part 20, such that the groove extends in the circumferential direction of the orifice member 50 over a length corresponding to the entire circumference of the orifice member 50 or slightly smaller than the entire circumference. The groove communicates with the equilibrium chamber through a hole formed through the orifice member 50, and with the pressure-receiving chamber 40 through a hole formed through the bottom wall of the lower part 20, whereby the orifice member 50 and the lower part 20 cooperate to define an orifice 52 for fluid communication between the pressure-receiving and equilibrium chambers 40, 48. Periodic changes of the fluid pressures in the chambers 40, 48 upon application of the vibrational load to the present engine mount 10 cause the fluid to be forced to flow through the orifice 52 between the chambers 40, 48. Thus, the engine mount 10 is capable of exhibiting a desired damping characteristic with respect to the vibrations within a given frequency range, for example, shaking vibrations of the engine, based on the resonance of the fluid flowing through the orifice 52.

In the second mounting member 14, on the other hand, the rubber plate 34 closing the recess 28 cooperates with the disc-shaped bottom member 26 to define a fluid-tightly enclosed working air chamber 54 on one side thereof remote from the pressure-receiving chamber 40. The bottom member 26 has an air passage 56 which communicates at one of its opposite ends with the working air chamber 54 and at the other end with a nipple 58 exposed to the atmosphere. The air passage 56 and the nipple 58 provide a pressure inlet through which an air pressure is applied to the working air chamber 54.

With the thus constructed engine mount 10 installed in position on the motor vehicle, an air conduit 60 is connected at one of its opposite ends to the nipple 58 and at the other end to a vacuum tank 62 through a switch valve 64. The vacuum tank 62 is connected to a suitable vacuum source. The switch valve 64 has a first position for applying a reduced pressure from the vacuum tank 62 to the working air chamber 54 through the air conduit 60 and the air passage 56, and a second position for applying the atmospheric pressure to the working air chamber 54. With the switch valve 64 switched between the first and second positions at a predetermined frequency, the reduced pressure and the atmospheric pressure are alternately applied to the working air chamber 54, whereby a periodic change in the pressure in the air chamber 54 takes place.

When the working air chamber 54 is exposed to the atmosphere, the rubber plate 34 maintains a substantially flat attitude or shape owing its own elasticity or resiliency. When the working air chamber 54 is exposed to the reduced pressure, the rubber plate 34 is displaced downwards or toward the bottom of the recess 28, against its elasticity. When the reduced pressure is removed from the air chamber 54, the rubber plate 34 is displaced upwards or toward the pressure-receiving chamber 40, to its original position due to its elasticity. Thus, the rubber plate 34 is oscillated or periodically reciprocated in the vertical direction with the switch valve 64 switched between the two positions at the predetermined frequency.

The oscillation of the rubber plate 34 causes a periodic change of the fluid pressure within the pressure-receiving chamber 40, influencing or adjusting the vibration damping characteristic of the engine mount 10. If the rubber plate 34 is oscillated at the frequency corresponding to the frequency of the vibration applied to the engine mount 10, the fluid pressure change in the pressure-receiving chamber 40 is absorbed or reduced by the oscillated rubber plate 34, whereby the transfer of the vibration between the vehicle power unit and body is restricted or reduced by the present engine mount 10. If the frequency of oscillation of the rubber plate 34 is adjusted depending upon the frequency of the shaking vibration of the engine (engine shake), the fluid pressure change in the pressure-receiving chamber 40 can be positively induced, so as to increase the amount of flows of the fluid through the orifice 52, for thereby improving the damping effect based on the flows of the fluid through the orifice 52.

The vacuum tank 62 and the switch valve 64 constitute a pressure control device for changing the pressure in the working air chamber 54 at a frequency of the input vibrations to be damped by the present engine mount 10.

The present engine mount 10 does not require an actuator such as electromagnetic drive means, and is accordingly simple and compact in construction with reduced weight and comparatively easy and economical to manufacture. The simple construction results in improved operating reliability and durability and comparatively easy maintenance or repair of the engine mount 10.

In other words, the present engine mount 10 is simple and compact in construction with reduced size and weight, but is capable of providing an excellent damping effect with various kinds of input vibrations, owing to the active control of the fluid pressure within the pressure-receiving chamber 40.

Further, the fluid pressure in the pressure-receiving chamber 40 can be controlled by utilizing the reduced pressure, which is available on any motor vehicle having an internal combustion engine, that is, by utilizing the reduced pressure in the intake system of the engine. Thus, the instant engine mount 10 does not require an exclusive energy source for oscillating the rubber plate 34.

Where the engine mount 10 is used in an environment in which compressed air is readily available, a positive pressure may be used in place of the reduced pressure, for oscillating the rubber plate 34. While the illustrated embodiment is adapted to alternately apply the reduced and atmospheric pressures to the working air chamber 54, the reduced or positive pressure may be periodically changed between two different reduced or positive levels.

Where the rubber plate 34 is oscillated by alternate application to the working air chamber 54 of the reduced and atmospheric pressures as in the illustrated embodiment, or the positive and atmospheric pressures, it is desirable to interpose suitable biasing means between the rubber plate 34 and the bottom member 26 of the second mounting member 14, in order to aid the rubber plate 34 in returning to the original position and shape by its elastic force.

While the orifice 52 and the equilibrium chamber 48 are provided to provide the engine mount 10 with the desired damping characteristic in the above embodiment, the provision of these orifice and equilibrium chamber is not essential. Further, the engine mount 10 may have a plurality of orifices which are tuned to respective different frequencies of the input vibrations.

In the engine mount 10 according to the first embodiment of FIG. 1, the single working air chamber 54 is provided to control the fluid pressure in the pressure-receiving chamber 40 through the oscillation of the rubber plate 34, a plurality of such working air chambers may be provided. For instance, the engine mount 10 may be modified such that a structure including the first mounting member 12 and having the equilibrium chamber 48 and orifice 52 is replaced by a structure which includes a mounting member similar to the second mounting member 14 and a second rubber plate that partially defines the pressure-receiving chamber 40 and a second working air chamber. In this modified engine mount, the second rubber plate is oscillated by application of air pressure to the second working air chamber, in synchronization with the oscillation of the first rubber plate 34. Where the two or more sets of rubber plates and working air chambers are provided as described above, the required amount of air flows into and from each working air chamber and the required distance of displacement of each rubber plate can be reduced, while permitting an effective amount of change of the fluid pressure-receiving chamber 40. Accordingly, the pressure control response of the pressure-receiving chamber 40 and the control response of the damping characteristic of the engine mount can be improved. In the first embodiment, the movable member oscillated by application of the air pressure to the working air chamber 54 is constituted by the rubber plate 34, metal plate 36 and metal ring 38. However, the rubber plate 34 need not be provided with these metal plate 36 and metal ring 38. That is, the rubber plate 34 may alone constitute the movable member.

Figure 2:
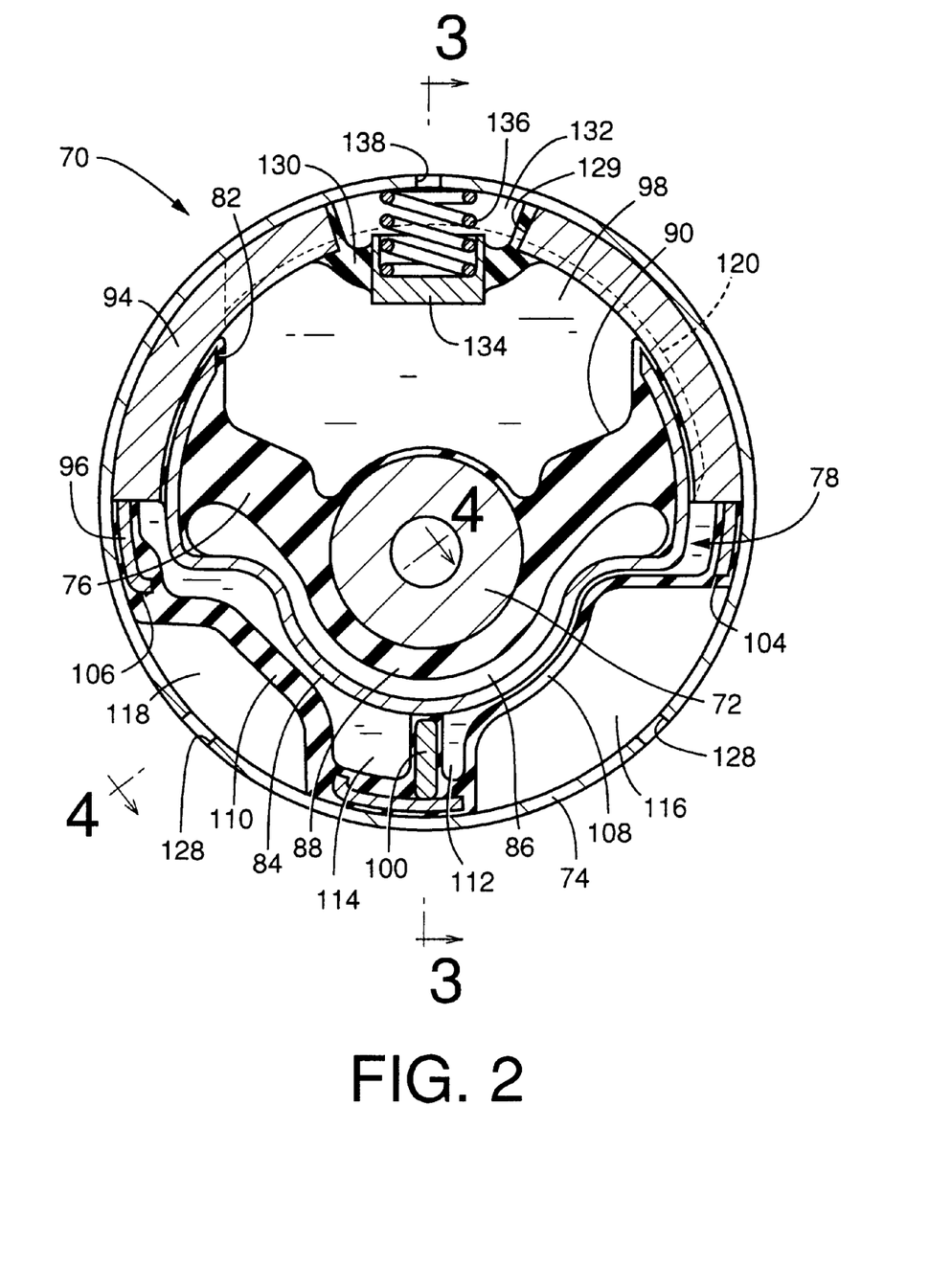
FIG. 2 is a transverse cross sectional view of an engine mount constructed according to a second embodiment of the invention.
Figure 3:
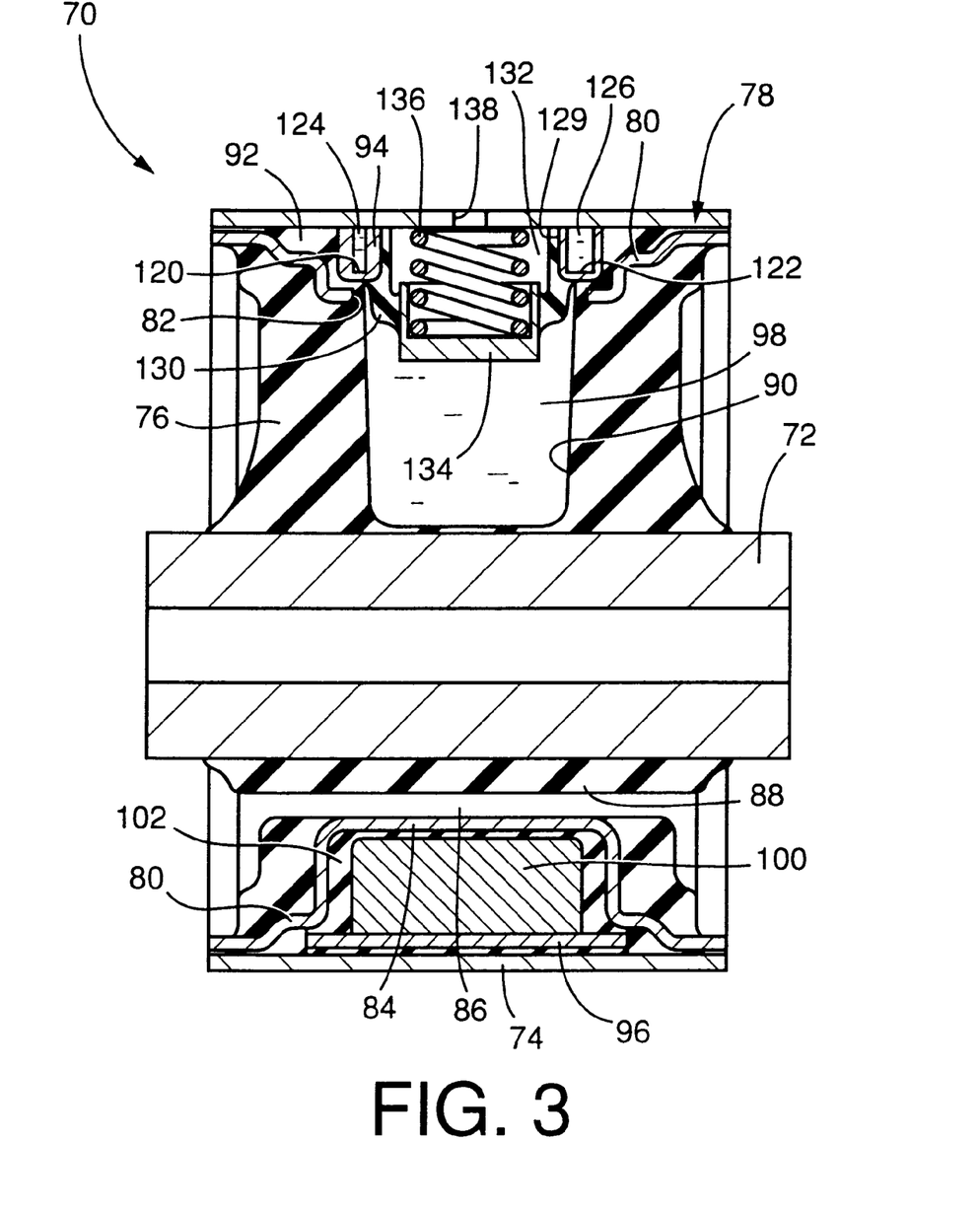
FIG. 3 is a cross sectional view taken along line 3—3 of FIG. 2.
Figure 4:
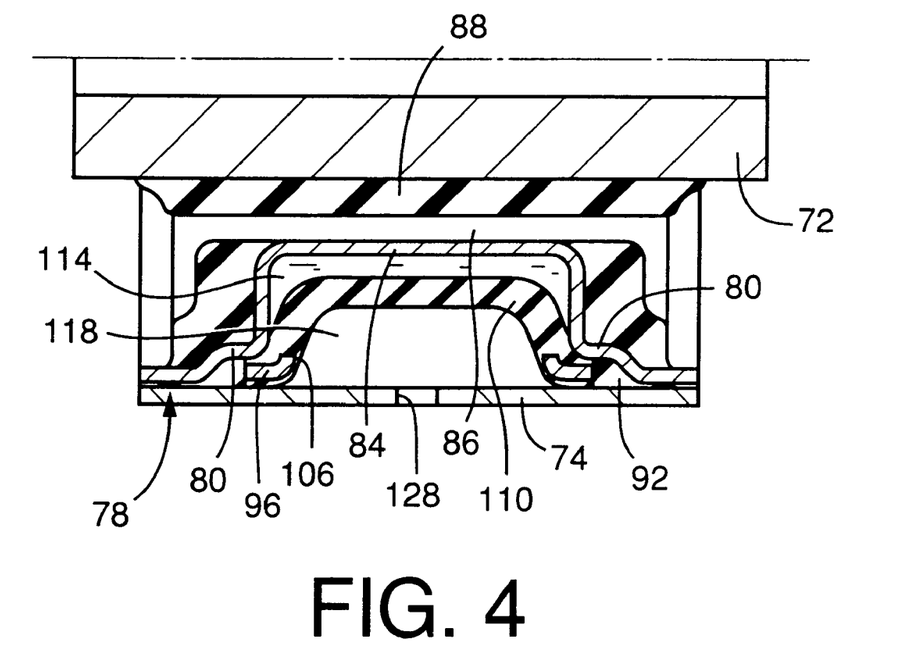
FIG. 4 is a cross sectional view taken along line 4—4 of FIG. 2.

Referring next to FIGS. 2–4, there will be described a cylindrical engine mount 70 constructed according to the second embodiment of the present invention.

The engine mount 70 includes a first mounting member in the form of an inner sleeve 72, and a second mounting member in the form of an outer sleeve 74. These inner and outer sleeves 70, 72 are made of metallic materials, and are spaced apart from each other by a predetermined distance in the radial direction. The two sleeves 70, 72 are elastically connected to each other by an elastic body 76 interposed therebetween. The inner and outer sleeves 72, 74 are fixed to one and the other of the power unit and body of a motor vehicle, so that the power unit is mounted on the body in a vibration damping manner. Before installation of the engine mount 70, the inner and outer sleeves 72, 74 are disposed eccentrically with respect to each other with a given radial offset distance. With the engine mount 70 installed on the vehicle, the elastic body 76 is compressed with the weight of the power unit acting thereon, and the inner and outer sleeves 72, 74 are brought into a substantially concentric or coaxial relationship with each other. The engine mount 70 is positioned such that the direction of offset of the inner and outer sleeve 72, 74 prior to the installation on the vehicle coincides with the vertical direction, so that the engine mount 70 is capable of damping the vibrations applied thereto in the vertical direction or a direction almost parallel to the vertical direction.

The inner sleeve 72 is a cylindrical member having a relatively large wall wall thickness and a relatively small diameter. A metallic sleeve 78 is disposed radially outwardly of the inner sleeve 72 such that the metallic sleeve 78 is radially offset by a given amount with respect to the inner sleeve 72. This metallic sleeve 78 is a cylindrical member having a relatively small wall thickness and a relatively large diameter. The metallic sleeve 78 has two stepped portions 80 with a smaller diameter near the opposite axial ends, as shown in FIGS. 3 and 4. The stepped portions 80 are formed over the entire circumference of the metallic sleeve 78. The metallic sleeve 78 has a window 82 in an upper one of two circumferential parts thereof which are diametrically opposed to each other in the direction of offset with respect to the inner sleeve 72. An axially intermediate portion of the metallic sleeve 78 has a recessed portion 84 in the other or lower circumferential part which is nearer to the axis of the inner sleeve 72 in the offset direction, than the upper circumferential part having the window 82. The recess of the recessed portion 84 is open in the radially outward direction.

The elastic body 76 is interposed between the inner sleeve 72 and the metallic sleeve 78 such that the inner sleeve 72 and the metallic sleeve 78 are bonded at their respective outer and inner circumferential surfaces to the elastic body 76, in the process of vulcanization of a rubber material to form the elastic body 76. An axial void 86 is left between the inner sleeve 72 and the metallic sleeve 78, so as to extend over the entire axial length of the engine mount 70. This axial void 86 is located in a circumferential portion of the engine mount 70 corresponding to the recessed portion 84 of the metallic sleeve 78, and has a circumferential dimension almost equal to a half of the entire circumference of the metallic sleeve 78. In the presence of the axial void 86, the elastic body 76 between the inner sleeve 72 and the metallic sleeve 78 is almost entirely disposed on only the upper side of the inner sleeve 72, namely, on only one of the vertically opposite sides of the inner sleeve 72 on which the radial offset distance to the metallic sleeve 78 is larger than on the other side. This arrangement is effective to reduce a tensile stress acting on the elastic body 76 due to the weight of the power unit. A rubber buffer 88 is provided to cover a portion of the outer circumferential surface of the inner sleeve 72 on the side of the axial void 88. Upon application of an excessive vibrational load to the engine mount 70, the inner sleeve 72 may abut on the recessed portion 84 of the metallic sleeve 78 through the rubber buffer 88, so as to prevent an excessive amount of tensile deformation of the elastic body 76.

The elastic body 76 has a pocket 90 aligned with the window 82 of the metallic sleeve 78. That is, the pocket 90 is formed in a circumferential portion of the elastic body 76 at which the vertical offset distance between the inner and metallic sleeves 72, 78 is the largest. The pocket 90 is open in the outer circumferential surface of the metallic sleeve 78 through the window 82. On the outer circumferential surface of the metallic sleeve 78, a sealing rubber layer 92 having a relatively small wall thickness is formed integrally with the elastic body 76, as shown in FIG. 3.

The inner sleeve 72, the metallic sleeve 78 and the elastic body 76 constitute an intermediate product, which is prepared by vulcanizing a rubber material to form the elastic body 76, within a mold in which the inner and metallic sleeves 72, 78 are positioned relative to each other. On this intermediate product, there are fitted an orifice member 94 and a retainer member 96, on which is finally fitted the outer sleeve 74 to produce the present engine mount 70. The orifice member 94 and the retainer member 96 both take the form of a substantially semi-cylindrical member, and cooperate to constitute a cylindrical structure fitted on an axially intermediate portion of the outer circumferential surface of the metallic sleeve 78. The outer sleeve 74, which is a cylindrical member having a relatively large diameter, is then fitted on the metallic sleeve 78 so as to cover the outer circumferential surface of the cylindrical structure consisting of the orifice member 94 and the retainer member 96.

The substantially semi-cylindrical orifice member 94 has a relatively large wall thickness, and is fitted on an upper portion of the outer circumferential surface of the metallic sleeve 78, at which the radial offset distance to the inner sleeve 72 is relatively large. The orifice member 94 is fitted on the metallic sleeve 78 such that the axial opposite end portions and the circumferential opposite end portions of the orifice member 94 are held in contact with the respective four portions of the metallic sleeve 78 which define the rectangular window 82, so that the window 82 aligned with the pocket 90 of the elastic body 76 is fluid-tightly closed by the orifice member 94, whereby a pressure-receiving chamber 98 is defined by the inner sleeve 72, the elastic body 76 (pocket 90) and the orifice member 94. The pressure-receiving chamber 98 is filled with a non-compressible fluid such as water, alkylene glycol, polyalkylene glycol or silicone oil. The pressure of the fluid in the chamber 98 is periodically changed due to elastic deformation of the elastic body 76 upon application of a vibrational load to the engine mount 70.

The substantially semi-cylindrical retainer member 96 has a relatively small wall thickness, and is fitted on a lower portion of the outer circumferential surface of the metallic member 78, at which the radial offset distance to the inner sleeve 72 is relatively small. The retainer member 96 is fitted on the metallic sleeve 78 such that the axial opposite end portions of the retainer member 96 are supported by the step portions 80 of the metallic sleeve 78, so that the recessed portion 84 is closed by the retainer member 96. The retainer member 96 has a partition wall 100 fixed to a circumferentially intermediate portion thereof so as to extend in the radially inward direction, through the recessed portion 84 of the metallic sleeve 78, as shown in FIG. 2. The free end of the partition wall 100 is held in close contact with the surface of the recessed portion 84, so as to divide the recess of the recessed portion 84 into two fluid tight sections on the opposite sides of the partition wall 100. These two sections of the recess are arranged in the circumferential direction of the metallic sleeve 78. To secure fluid tightness of those two section of the recess, the end face of the partition wall 100 in contact with the recessed portion 84 is covered with a sealing rubber member 102.

The retainer member 96 has a first opening 104 and a second opening 106 formed in respective two circumferential portions thereof on the circumferentially opposite sides of the partition wall 100. These first and second openings 104, 106 are fluid-tightly closed by a first flexible diaphragm 108 and a second flexible diaphragm 110, respectively, which are bonded by vulcanization to the edges of the openings 104, 106. The first and second diaphragms 108, 110 are accommodated in the above-indicated two sections of the recess of the recessed portion 84 on the opposite sides of the partition wall 100, such that the two diaphragms 108, 110 are curved radially inwardly of the outer sleeve 74, as shown in FIG. 2.

As described above, the recess of the recessed portion 84 of the metallic sleeve 78 is divided by the partition wall 100 into the two sections, which are fluid-tightly closed by the retainer member 96 and the outer sleeve 74. The first flexible diaphragm 108 on one side of the partition wall 100 cooperates with the metallic sleeve 78 to define a first equilibrium chamber 112, while the second flexible diaphragm 110 on the other side of the partition wall 10 cooperates with the metallic sleeve 78 to define a second equilibrium chamber 114. Elastic deformation or displacement of the first and second flexible diaphragms 108, 110 permits volume changes of the first and second equilibrium chambers 112, 114, which are filled with the same non-compressible fluid as that in the pressure-receiving chamber 98.

The first and second flexible diaphragms 108, 110 have substantially the same shape and size, but have different thickness values. That is, the thickness of the first diaphragm 108 is made smaller than that of the second diaphragm 110, so that the spring stiffness of the first diaphragm 108 partially defining the first equilibrium chamber 112 is smaller than that of the second diaphragm 110 partially defining the second equilibrium chamber 114. The first and second flexible diaphragms 108, 110 cooperates with the outer sleeve 74 to define respective two air chambers 116, 118, which communicate with the atmosphere through respective two vents 128 formed through the outer sleeve 74. The air chambers 116, 118 facilitate deformation or displacement of the flexible diaphragms 108, 110.

The orifice member 94 has a first groove 120 and a second groove 122 formed in the outer circumferential surface. These grooves 120, 122, which have suitable lengths, are closed by the outer sleeve 74 to define a first orifice 124 for fluid communication between the pressure-receiving chamber 98 and the first equilibrium chamber 112, and a second orifice 126 for fluid communication between the pressure-receiving chamber 98 and the second equilibrium chamber 114. The first and second orifices 124, 126 are independent of each other, and permit the fluid to flow between the pressure-receiving chamber 98 and the equilibrium chambers 112, 114, upon application of the vibrations to the engine mount 70, so that the vibrations can be damped due to resonance of the fluid flowing through the orifices 124, 126.

The first orifice 124 has a smaller ratio A/L than the second orifice 126, where "A" represents the cross sectional area of flow of the orifice 124, 126, while "L" represents the length of the orifice 124, 126. In this arrangement, the engine mount 70 exhibits a damping effect with respect to a vibrational load having a relatively low frequency, based on the resonance of the fluid flow through the first orifice passage 124, and a damping effect with respect to a vibrational load having a relatively high frequency, based on the resonance of the fluid flow through the second orifice 126. In other words, the first and second orifices 124, 126 are tuned to relatively low and high frequencies of the input vibrations. While the first orifice 124 has a larger resistance to the fluid flows therethrough, than the second orifice 126, there arises a sufficiently large amount of flow of the fluid through the first orifice 124 upon application of the low-frequency vibrations, since the spring stiffness of the second diaphragm 110 of the second equilibrium chamber 114 is made higher than that of the first diaphragm 108 of the first equilibrium chamber 112.

The orifice member 94 has a through-hole 129 formed therethrough in a circumferentially and axially central portion thereof which partially defines the pressure-receiving chamber 90. This through-hole 129 is fluid-tightly closed by a rubber plate 130 such that the rubber plate 130 is bonded at its periphery to the edge of the through-hole 129, and partially defines the pressure-receiving chamber 98. The rubber plate 130 cooperates with the outer sleeve 74 to define a fluid-tight working air chamber 132. The outer sleeve 74 has an inlet 138 formed therethrough in communication with the air chamber 132. An air conduit connected to a suitable air pressure source and a switch valve is connected to this inlet 138. The inlet 138 functions as a pressure inlet through which an air pressure is applied to the working air chamber 132.

To a central portion of the rubber plate 130, there is bonded a generally cup-shaped metallic holder member 134, which functions to adjust the spring characteristic of the rubber plate 130 and prevent irregular deformation of the rubber plate 130. The rubber plate 130 and the holder member 134 constitute a movable member. The working air chamber 132 accommodates a coil spring 136 interposed between the outer sleeve 74 and the holder member 134. The coil spring 136 biases the rubber plate 130 in the radially inward direction of the outer sleeve 74, namely, so as to force the rubber plate 130 toward the pressure-receiving chamber 98.

In the engine mount 70 constructed as described above, the air conduit is connected to the inlet 138, so that the working air chamber 132 is exposed alternately to the reduced and atmospheric pressures, with the switch valve being switched between its two positions, as described above with respect to the first embodiment, whereby the pressure in the working air chamber 132 is periodically changed to oscillate the rubber plate 130 in the radial direction of the engine mount 70.

The oscillation of the rubber plate 130 causes a periodic change of the fluid pressure in the pressure-receiving chamber 98, thereby adjusting the vibration damping characteristic of the engine mount 70. Like the engine mount 10 of the first embodiment, the engine mount 70 of the present embodiment exhibits an excellent vibration damping effect by oscillating the rubber plate 130 at a frequency corresponding to the frequency of the input vibration, to thereby control the fluid pressure in the pressure-receiving chamber 98. The oscillation of the rubber plate 130 also permits increased amounts of the fluid flows through the first and second orifices 124, 126, for improving the vibration damping effect based on the fluid flows through the orifices 124, 126.

Like the engine mount 10 of the first embodiment, the engine mount 70 does not require an actuator such as electromagnetic drive means, and is accordingly simplified and compact in construction with reduced weight and comparatively easy and economical to manufacture. Thus, the engine mount 70 has substantially the same advantages as the engine mount 10, as described above.

Further, the rubber plate 130 in the present engine mount 70 can be oscillated with high accuracy at a higher frequency than the rubber plate 34 in the first embodiment, owing to the provision of the coil spring 136 whose biasing force is added to the elastic force of the rubber plate 130 when the rubber plate 130 is returned or restored to the original position and shape upon exposure of the working air chamber 132 to the atmospheric pressure. Thus, the engine mount 70 exhibits an improved damping effect with respect to the input vibrations having relatively high frequencies. Further, the coil spring 136 functions to prevent early fatigue of the rubber plate 130, and consequent deterioration of its oscillating performance and accuracy, leading to improved durability of the engine mount 70.

In the present engine mount 70, too, the reduced pressure used together with the atmospheric pressure for oscillating the rubber plate 130 may be replaced by a positive pressure. Further, the reduced and atmospheric pressures may be replaced by two different values of a reduced or positive pressure.

The coil spring 136 disposed in the working air chamber 132 is not essential and may be eliminated. In the absence of the coil spring 136, the rubber plate 130 is returned to the original position (radially inner position) by its own elasticity only, like the rubber plate 34 in the first embodiment.

While the orifices 124, 126 and the equilibrium chambers 112, 114 are provided to provide the engine mount 70 with the desired damping characteristic in the second embodiment, the provision of these orifices and equilibrium chambers is not essential. Only one of the two orifices 124, 126 may be provided.

The principle of the present invention is also applicable to a cylindrical fluid-filled vibration damping device of the type having a plurality of pressure-receiving chambers, for instance, a pair of pressure-receiving chambers which are formed on diametrically opposite sides of the inner sleeve and which communicate with each other through an orifice, as disclosed in JP-B-48-36151 and JP-A-56-164242. In this case, two movable members such as rubber plates are provided for the respective two pressure-receiving chambers. For instance, the rubber plate 230 as used for the pressure-receiving chamber 98 in the above embodiment may be provided for each of the two pressure-receiving chambers.

Although the fluid-filled vibration damping devices in the form of engine mounts for motor vehicles have been described above for illustrative purpose, it will be understood that the principle of this invention is equally applicable to other fluid-filled damping devices for motor vehicles, such as body mounts, differential mounts and suspension bushings, and also to various dampers not used for the motor vehicles.

While the presently preferred embodiments of the invention have been described above in detail for illustrative purpose only, it is to be understood that the invention is not limited to the details of these illustrated embodiments, but may be embodied with various changes, modifications and improvements, which may occur to those skilled in the art, without departing from the spirit and scope of the present invention defined in the following claims.

What is claimed is:

1. A fluid-filled vibration damping device comprising:
   a first and a second mounting member which are spaced apart from each other;
   an elastic body elastically connecting said first and second mounting members and partially defining at least one pressure-receiving chamber each of which is filled with a non-compressible fluid, said elastic body being elastically deformed so as to cause a change in a pressure of said fluid in said each pressure-receiving chamber, upon application of a vibrational load between said first and second mounting members;
   a movable member exposed directly to and partially defining at least one of said at least one pressure-receiving chamber and movable relative to said first and second mounting members;
   said movable member partially defining a working air chamber on one of opposite sides thereof which is remote from the corresponding pressure-receiving chamber, said movable member being oscillatable by a periodic change of an air pressure in said working air chamber, so as to cause a periodic change of a volume of said corresponding pressure-receiving chamber and a periodic change of the pressure of said fluid in said corresponding pressure-receiving chamber;
   means for defining a pressure inlet through which said air pressure is applied to said working air chamber; and
   a pressure control device connected to said working air chamber through said pressure inlet, for changing the air pressure in said working air chamber in synchronization with a frequency of a vibrational load to be damped by the damping device.

2. A fluid-filled vibration damping device according to claim 1, wherein said movable member includes a rubber plate having an elasticity by which said movable member is restored to an original shape thereof.

3. A fluid-filled vibration damping device according to claim 1, further comprising biasing means for biasing said movable member in a predetermined direction.

4. A fluid-filled vibration damping device according to claim 1, wherein said movable member and said working air chamber are provided at each of a plurality of positions of said corresponding pressure-receiving chamber, such that the movable members at said plurality of positions partially define said corresponding pressure-receiving chamber and such that the working air chambers at said plurality of positions are formed independently of each other.

5. A fluid-filled vibration damping device according to claim 1, further comprising:
   at least one flexible diaphragm each of which partially defines an equilibrium chamber filled with said non-compressible fluid, such that said each flexible diaphragm permits a change in a volume of said equilibrium chamber; and
   means for defining an orifice for fluid communication between said corresponding pressure-receiving chamber and said equilibrium chamber.

6. A fluid-filled vibration damping device according to claim 1, wherein said first mounting member consists of an inner sleeve, while said second mounting member consists of an outer sleeve disposed radially outwardly of said inner sleeve, said elastic body being interposed between said inner and outer sleeves and having a pocket which is open in an outer circumferential surface thereof and closed by said outer sleeve so as to form said corresponding pressure-receiving chamber, said movable member being disposed within said pocket and cooperating with said outer sleeve to define said working air chamber.

7. A fluid-filled vibration damping device according to claim 6, further comprising:
   a flexible diaphragm which is disposed between said inner and outer sleeves at a position spaced from said corresponding pressure-receiving chamber in a circumferential direction of said inner and and sleeves, said flexible diaphragm partially defining an equilibrium chamber filled with said non-compressible fluid, such that said flexible diaphragm permits a change in a volume of said equilibrium chamber; and
   an orifice member disposed in fluid-tight contact with an inner circumferential surface of said outer sleeve so as to extend along an opening of said pocket in said circumferential direction, said orifice member and said outer sleeve defining an orifice for fluid communication between said corresponding pressure-receiving chamber and said equilibrium chamber,
   and wherein said orifice member has a through-hole, and said movable member includes a rubber plate which is bonded to said orifice member and which closes said through-hole, said rubber plate cooperating with said orifice member and said outer sleeve to define said working air chamber, said outer sleeve having said pressure inlet.

8. A fluid-filled vibration damping device according to claim 1, wherein said pressure control device includes a vacuum pressure source and a switch valve for selectively applying a reduced pressure from said vacuum pressure source and an atmospheric pressure to said working air chamber through said pressure inlet.

9. A fluid-filled vibration damping device according to claim 1, wherein said at least one pressure-receiving chamber consists of a plurality of pressure-receiving chambers each of which is partially defined by said movable member which partially defines said working air chamber.

10. A fluid-filled vibration damping device according to claim 1, wherein said movable member comprises an elastic member, and a rigid member attached to said elastic member.

11. A fluid-filled vibration damping device comprising:
    a first and a second mounting member which are spaced apart from each other;
    an elastic body elastically connecting said first and second mounting members and partially defining at least one pressure-receiving chamber each of which is filled with a non-compressible fluid, said elastic body being elastically deformed so as to cause a change in a pressure of said fluid in said each pressure-receiving chamber, upon application of a vibrational load between said first and second mounting members;

a movable member exposed directly to and partially defining at least one of said at least one pressure-receiving chamber and movable relative to said first and second mounting members;

at least one flexible diaphragm each of which partially defines an equilibrium chamber filled with said non-compressible fluid, such that said each flexible diaphragm permits a change of a volume of said equilibrium chamber;

means for defining an orifice for fluid communication between the corresponding pressure-receiving chamber and said equilibrium chamber;

said movable member partially defining a working air chamber on one of opposite sides thereof which is remote from said corresponding pressure-receiving chamber, said movable member being oscillatable by a periodic change of an air pressure in said working air chamber, so as to cause a periodic change of a volume of said corresponding pressure-receiving chamber;

means for defining a pressure inlet through which said air pressure is applied to said working air chamber; and a pressure control device connected to said working air chamber through said pressure inlet, for changing the air pressure in said working air chamber in synchronization with a frequency of a vibrational load to be damped by the damping device.

* * * * *